Patented July 6, 1937

2,086,187

UNITED STATES PATENT OFFICE 2,086,187

SURFACING LUMBER

Arthur J. Norton, North Tonawanda, N. Y., assignor to General Plastics, Inc., North Tonawanda, N. Y.

No Drawing. Application October 9, 1933, Serial No. 692,907

2 Claims. (Cl. 154—2)

This invention relates to a method of surfacing lumber and more particularly to a method of treating and coating lumber to strengthen the same and to impart water proof properties thereto.

In the use of compound lumber it has been found that particular types of lumber, as for instance fir, is subject to checking and cracking usually along the grain line which checking and cracking tends to stretch and rupture any paint film or other protective coating which has theretofore been applied to the surface of articles of this type thus exposing the lumber or wood to entrance of water, subjecting it to frost action and other deleterious and destructive forces.

I have discovered that checking and cracking may be prevented, and a strong surface produced upon the compound lumber, a surface adapted to retain and hold a protective coating of the usual type, that is, a pigment carried in an oil vehicle; that the film of protective material remains continuous and unbroken and that the foundation surface of the wood is not opened up along the grain line or by checking and cracking, but presents an unbroken, continuous, strengthened and water impervious surface.

In the preparation of compound lumber the individual plies are coated with a bond of dispersed resin and water, the plies assembled and a definite glue line produced between the plies with substantially no bleeding of the bond into the interior of the plies by subjecting the plies to suitable heat and pressure to produce a bond of permanently set resin. This mode of bonding is more particularly set forth in Patent No. 1,917,020.

To provide effective strengthening to wood surfaces I glue a thin sheet of fibrous material, such as craft board, or paper of any desired thickness, as for instance four mil paper, by spreading a finely divided resin upon the surface of the ply material and subjecting the same to suitable heat and pressure in order to produce a definite glue line of the permanently set resin. This operation may be performed concurrently with the manufacture of plywood or compound lumber, or where conditions warrant, the surfacing operation may be performed subsequently to the production of the material to be surfaced.

To produce the proper strength in the surface I treat the exterior surface of the bonded paper with a solution of a resin such as thermo-setting resin of the phenol formaldehyde type although other resins capable of being advanced may be used, and partially cure or advance this material by subjecting it to a baking operation for a short period of time. The type of surface coating solution which I prefer to use is an alkali solution of the resin which wets and impregnates the paper, is compatible with the bond already produced and by means of which the paper or other fiber surfacing material is caused to adhere to the surface of the wood, strengthens the wood surface preventing checking and cracking and makes possible the use of a protective coating without an initial priming coat and by the use of less material.

Under some conditions I may use a varnish solution of a thermo-setting resin or other solution of resin in an organic solvent, spraying or otherwise spreading this upon the paper and subjecting it to a partial advancement or cure. In any event, a surface is produced which is impervious to the entrance of water, is strong and adherent, and prevents the face of the lumber from opening up due to the expansion and contraction encountered upon moisture absorption and loss.

What is claimed is:

1. The process of surface strengthening compound lumber which comprises applying to the surface to be strengthened a suspensoid colloid dispersion of fusible heat hardenable resin in a non-solvent for the resin, applying a layer of fibrous sheet material to the lumber with the suspensoid colloid interposed between the lumber and sheet material, heating the assembled lumber and sheet material to convert the resin to the infusible state without bleeding through the sheet material, thereafter coating the surface of the sheet material, with a solution of a fusible heat hardenable resin and thereafter converting the resin to the infusible state.

2. Surface strengthened composite lumber comprising a wood member having a sheet of fibrous material bonded thereto by means of a glue line of set heat hardened resin formed from a suspensoid colloid of fusible heat hardenable resin which upon being changed to the infusible state remains interposed between the wood member and the sheet material without bleeding, and a coating upon the sheet material of heat hardened resin.

ARTHUR J. NORTON.